United States Patent [19]

Maldonado

[11] Patent Number: 5,726,714
[45] Date of Patent: Mar. 10, 1998

[54] DETECTOR FOR DETECTING RECEPTION OF A COLOR TELEVISION SIGNAL CODED ACCORDING TO THE SECAM STANDARD

[75] Inventor: Pierre-Jean Maldonado, Seyssins, France

[73] Assignee: SGS-Thomson Microelectronics S.A., Saint Genis, France

[21] Appl. No.: 549,600

[22] Filed: Oct. 27, 1995

[30] Foreign Application Priority Data

Oct. 31, 1994 [FR] France ................... 94 13405

[51] Int. Cl.$^6$ ................... H04N 9/64; H04N 5/46
[52] U.S. Cl. ................... 348/558; 348/638
[58] Field of Search ................... 348/554, 555, 348/558, 638, 691, 504, 509; H04N 9/64, 5/46

[56] References Cited

U.S. PATENT DOCUMENTS

| | | | |
|---|---|---|---|
| 4,072,983 | 2/1978 | Aschwanden | 358/19 |
| 4,438,461 | 3/1984 | Hinn et al. | 358/11 |
| 4,661,844 | 4/1987 | Rufrav | 358/23 |
| 5,136,369 | 8/1992 | Bohme et al. | 358/11 |
| 5,264,936 | 11/1993 | Meunier et al. | 358/188 |

FOREIGN PATENT DOCUMENTS

| | | | |
|---|---|---|---|
| A-0 245 038 | 11/1987 | European Pat. Off. | H04N 9/64 |
| A-0 614 320 | 9/1994 | European Pat. Off. | H04N 9/64 |

OTHER PUBLICATIONS

French Search Report from French Patent Application No. 94 13405, filed Oct. 31, 1994.
IEEE Transactions on Consumer Electronics, vol. 37, No. 3, Aug. 30, 1991 New York US, pp. 197-202 Imbert, M., et al., "A Full Integrated Automatic Multistandard Chroma Decoder".
Funkschau, vol. 65, No. 1, Dec. 30, 1992 Munchen DE, pp. 64-71. Achterberg H. "Hochintegrierte Fernsehschaltung".

Primary Examiner—Glenton B. Burgess
Attorney, Agent, or Firm—Wolf, Greenfield & Sacks, P.C.; James H. Morris

[57] ABSTRACT

The invention relates to a detector for detecting reception of a color television signal coded according to the SECAM standard of the type including a filter pretuned by a general control of the filters of an integrated circuit for identifying the standard according to which the television signal is coded and a phase comparator receiving the input and output signals of the filter, and including circuitry for tuning the frequency of the filter on the actual mean frequency of two consecutive lines of the signal.

25 Claims, 2 Drawing Sheets

DETECTOR FOR DETECTING RECEPTION OF A COLOR TELEVISION SIGNAL CODED ACCORDING TO THE SECAM STANDARD

BACKGROUND OF THE INVENTION

1. Field of the Invention

The present invention relates to a detector for detecting reception of signals coded according to the SECAM standard within a color television signal receiver. It more particularly applies to the implementation of such a device within an integrated multistandard reception circuit.

2. Discussion of the Related Art

A circuit for receiving television signals in a multistandard receiver conventionally includes a device for automatically identifying the standard according to which the color television signal is coded, and particularly the chrominance information. The chrominance information is extracted from the received signal by means of a band-pass filter eliminating the luminance information of the signal.

The chrominance information of a color television signal includes two parameters, commonly referred to as B-Y and R-Y, which, once demodulated, allow the receiver to recover the proportion of the three basic colors of the signal, that is, red, green, blue. The two parameters B-Y and R-Y are alternatively transmitted, i.e. one line out of two.

Three standards according to which the color television signal can be coded are to be distinguished. These standards are the SECAM standard, the PAL standard and the NTSC standard, and they are distinguished by the way in which the information to be transmitted is modulated.

For the SECAM standard, the signal is transmitted in amplitude and frequency modulation. The amplitude of the modulation contains the luminance information of the current line whereas the frequency of the modulation contains the chrominance information. The frequency modulation is performed alternatively, i.e. the carrier is different for the B-Y lines and for the R-Y lines. The carrier frequencies are generally respectively 4.25 MHz and 4.406 MHz for the B-Y and R-Y signals. The respective frequency modulation ranges are −350 to +500 kHz for the B-Y and −500 to +350 kHz for the R-Y.

For the PAL and NTSC standards, the modulation is a quadratic phase and amplitude modulation. The amplitude of the modulation contains, as previously, the luminance information, but the chrominance information of the current line is provided by the phase and the amplitude of the modulation. The frequency of the carrier is generally either 4.43 MHz or 3.58 MHz.

The difference between the PAL and NTSC standards is that for the PAL standard, the R-Y parameter is transmitted with a phase alternation of more or less ninety degrees.

FIG. 1A shows timing diagrams illustrating, for the SECAM standard, the waveform of the composite video baseband signal (CVBS) which is processed by a circuit for identifying the television standard.

The CVBS signal successively includes a line synchronization pulse (LS), a BURST reference signal, and a line, alternatively B-Y and R-Y. The LS pulse and the BURST reference signal are transmitted during each line fly-back.

Identifying the standard within a multistandard receiver is conventionally performed during the reception of the reference signal, commonly called reference burst, i.e. at each line fly-back. The reference burst, preceded by the LS pulse, is centered on a plateau region corresponding to the BLACK level of no chrominance data for the current parameter. In other words, the BURST reference burst is inscribed in a plateau region corresponding to the level of "black" of parameter B-Y or R-Y.

During the reference burst, the chrominance signal corresponds, according to the SECAM standard, to the pure frequency of the carrier of the current line. It corresponds to a 180° phase according to the NTSC standard, and to a 135° or 225° phase with respect to the current line according to the PAL standard. The amplitude of the signal during a reference burst is standardized, i.e. it is approximately 300 mV peak-to-peak.

Identifying the standard is either performed on the entire burst (PAL or NTSC), or during a portion of this reference burst (SECAM). The time range during which the standard is being identified is commonly called a "Burst Gate" (BG). FIG. 1B is a timing diagram illustrating the burst gate BG associated with the SECAM standard.

Identifying the standard uses band-pass filters. The output signals of these filters allow performance of both the "time reset" of the receiver, i.e. the synchronization with respect to the B-Y or R-Y type of line, and determination of the standard according to which the chrominance information is coded.

The various approaches conventionally used for identifying a signal coded according to the SECAM standard are the following.

A first approach consists in using an external band-pass filter tuned outside of the two 4.25 MHz and 4.406 MHz carrier frequencies. The output of the filter passes through a gate controlled by the BG signal, after which the amplitude difference between two consecutive lines is measured. If the difference is not zero, the presence of a signal coded according to the SECAM standard is indicated.

A second approach consists in generating the two frequencies of the carriers relative to the SECAM standard by means of a quartz oscillator at 4.43 MHz otherwise used for generating a reference frequency of the PAL standard detector. The signal is then demodulated during the burst gate BG by means of these two frequencies, then the results of the two demodulations are sequentially interpreted. A drawback of this approach is that it needs a frame control on a wide frequency range. The mode locking loops used for this purpose are difficult to control, for instance in case of changes in the operating temperature that may cause a drift of the frequency range that the loops are designed to track.

A third approach consists in using an external, high-Q, band-pass filter, centered between the two carrier frequencies, i.e. on a frequency of about 4.32 Mhz, and to use the amplitude or phase information of the filter output. European patent application 0 245 0238 discloses a circuit that uses the peak amplitude of the output signal of a band-pass filter centered on a frequency of 4.33 Mhz. FIG. 2 illustrates an example wherein the phase information from an external band-pass filter 1 is used. The central frequency can, in certain cases, be provided by a digital frequency reference. The output of the filter passes through a phase comparator 2 sampled by the BG signal and which compares the output phase of the filter with respect to the phase of the signal entering the filter. The phase characteristic of the output signal of the filter provides results with opposite signs on one line out of two if the current signal is coded according to the SECAM standard, whereas they have the same sign if the current signal is coded according to the PAL or NTSC standard. Comparator 2 thus issues during the burst gates BG a signal which, in the presence of an incoming signal coded according to the SECAM standard, has the same amplitude but opposite signs for two consecutive lines.

The output of comparator 2 is sent on a flip-flop 3 controlled by the "time reset" signal R. The output of flip-flop 3 is used for charging or discharging a storage capacitor CKS, the voltage of which indicates the result of the identifying of the SECAM standard. This result is sequentially utilized with the identification results supplied by storage capacitors of the detectors of the other standards.

A drawback of this approach, using the phase and amplitude information, is that it is difficult to make the external band-pass filter used insensitive to changes in the operating temperature which induce identification errors as a result of the shift of the central frequency. Indeed, if the central frequency of the filter has shifted and goes beyond one of the 4.25 MHz and 4.406 MHz carrier frequencies, the result of the phase comparison will be interpreted as no identification of the SECAM standard.

The recent evolution of multistandard receivers, and particularly the integration of filters within the circuits, avoiding the use of external filters, has resulted in the appearance of circuits for identifying the standard in which all the filters are controlled by a common voltage. Thus, the central frequencies of the filters can all be pretuned in the same way. The tolerance of the existing control circuits sets the central frequency of the filters on approximately plus or minus five percent of the theoretical tuning frequency of the filter.

If such a common control of the central frequencies of the filters allows pretuning of the filters, for instance so that all the tuning frequencies change in the same way under changes of the operating temperature, the tolerance range does not allow obtaining a sufficiently accurate centering of the frequency of a band-pass filter for identifying the SECAM standard centered between the two carrier frequencies of the standard. Indeed, the two 4.25 MHz and 4.406 MHz frequencies are within the tolerance range (plus or minus approximately 200 kHz) of a filter pretuned to the frequency of 4.32 MHz. Thus, the pretuning common to all filters does not allow avoiding errors in identifying the SECAM standard if the tuning frequency of the filter is not located between the two carrier frequencies.

SUMMARY OF THE INVENTION

The present invention aims at providing a detector for detecting reception of a color television signal coded according to the SECAM standard which uses a filter pretuned by the general control of the filters in an integrated circuit for identifying the standard according to which the color television signal is coded and which allows an identification of the SECAM standard which is reliable and insensitive to changes in the pretuning frequency of the filter.

In order to achieve this and other objects, the present invention provides a detector for detecting reception of a color television signal coded according to the SECAM standard including a filter pretuned by a general control of the filters in an integrated circuit for identifying the standard according to which the color television signal is coded and a phase comparator receiving the input and output signals of the filter, and including means for tuning the frequency of said filter on the actual mean frequency of two consecutive lines of the signal.

According to an embodiment of the invention, said means are constituted by a reverse feedback loop including the phase comparator and a capacitor for storing the value resulting from said phase comparison.

According to an embodiment of the invention, the output of the phase comparator is connected to a first terminal of the capacitor, the other terminal of which is grounded, and to a transconductance amplifier, the output of which is provided on a terminal for adjusting the tuning frequency of the filter.

According to an embodiment of the invention, the output of the phase comparator is sent, via a flip-flop controlled by a "time reset" signal, to a capacitor for storing the result of the identification.

According to an embodiment of the invention, the theoretical pretuning frequency of said filter corresponds to the mean frequency between the two chrominance carrier frequencies of the SECAM standard.

According to an embodiment of the invention, said filter is a high-pass filter with a high Q-factor.

According to an embodiment of the invention, said filter is a band-pass filter and a 90° static phase shifter is installed upstream of said filter.

According to an embodiment of the invention, the phase comparator is sampled during reference bursts which are included in the television signal.

According to an embodiment of the invention, the detector includes, upstream of said filter, a gain stage sampled during the line fly-back periods.

According to an embodiment of the invention, the theoretical tuning frequency of said filter is 4.32 MHz.

The foregoing and other objects, features and advantages of the present invention will be discussed in the following description of specific embodiments, taken in conjunction with the accompanying drawings but not limited by them.

DETAILED DESCRIPTION

Figure 1A:
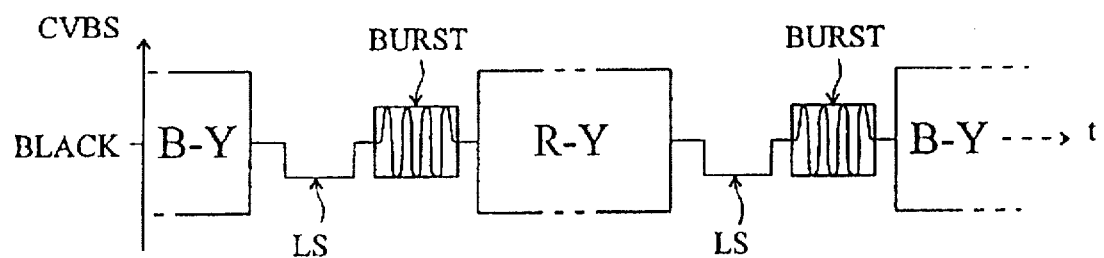
FIGS. 1A, 1B and 2, which have been previously described, describe the state of the art and the problem to solve.
Figure 1B:
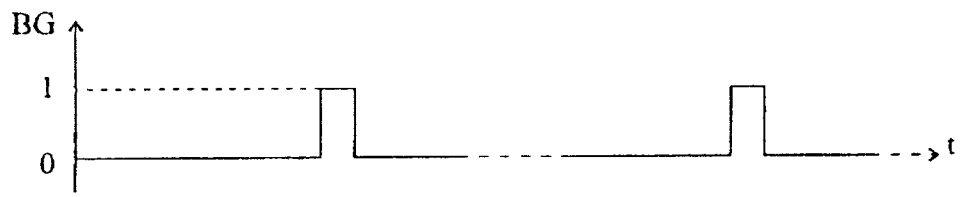
Figure 2:
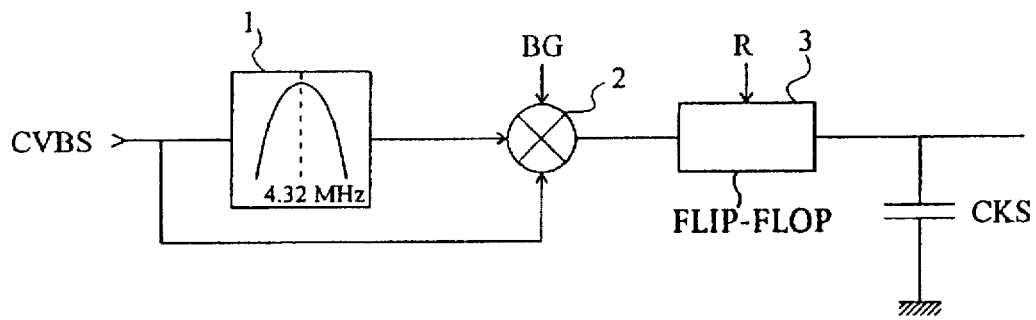
Figure 3:
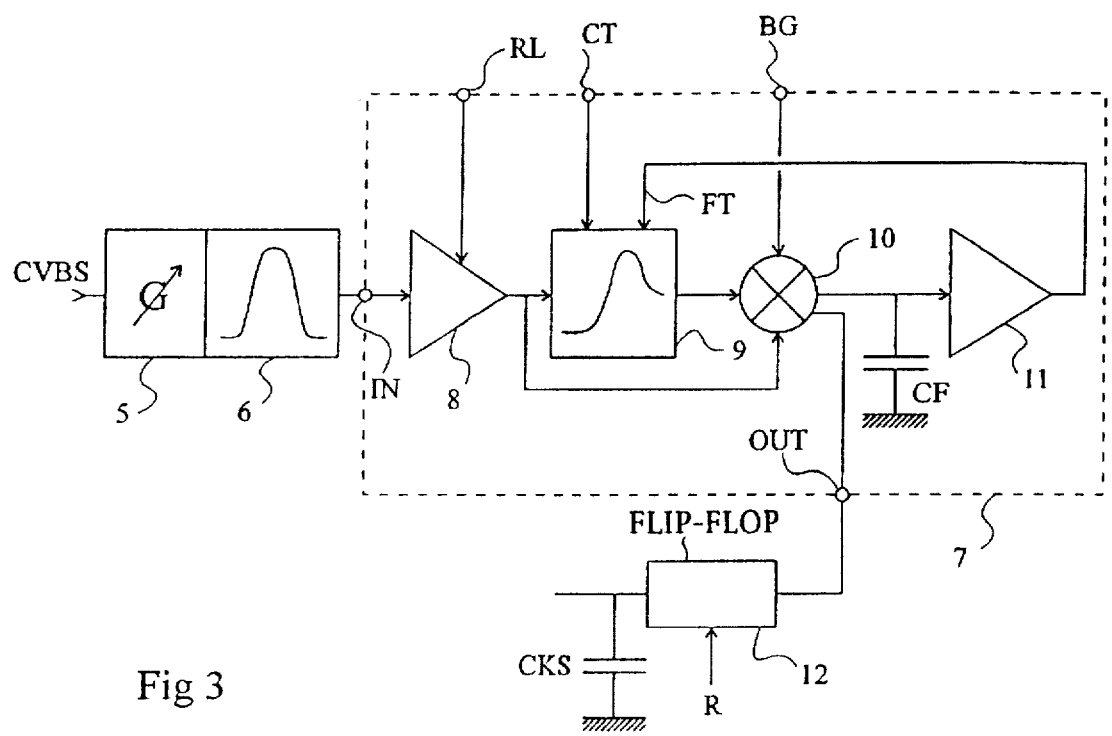
FIG. 3 shows an embodiment of a detector for detecting reception of a color television signal coded according to the SECAM standard according to the invention.

Referring to FIG. 3, the CVBS signal as shown in FIG. 1A is sent to a gain-controlled amplifier 5. A device for eliminating the d.c. component (not shown), for example a coupling capacitor, is installed upstream of amplifier 5. Amplifier 5 raises the level of the received signal to a standardized level in order to allow its decoding. Amplifier 5 is associated with a bell filter 6 for extracting the chrominance information present in the signal. The output of the whole amplifier 5/filter 6 supplies a standardized amplitude signal (approximately 300 mV peak-to-peak) centered on a BLACK reference level which level corresponds to the level of no chrominance data for the current parameter.

The output of filter 6 constitutes the signal to be utilized by the standard detector. This signal is thus sent on a first input IN of a detector 7 for detecting signals coded according to the SECAM standard according to the invention.

Three other RL, CT and BG inputs of detector 7 receive control signals which are conventionally present within an integrated circuit for identifying the coding standard of a television signal.

The input RL receives a sampling signal during the line fly-back periods (comprising the synchronization pulse and the reference burst). This signal RL is provided to a sampling input of a gain stage 8 on which the signal arriving into detector 7 through the input IN is sent. The gain stage 8 thus eliminates the active lines B-Y and R-Y of the signal in order to avoid possible contamination of the signal used by detector 7 by the active chrominance information of lines B-Y and R-Y.

The output of stage 8 is sent to a high-pass filter 9 with a high Q-factor and having two terminals respectively for pretuning and adjusting its cut-off frequency. The pretuning terminal receives the signal CT which corresponds to the general control of the filters of the identification circuit in which detector 7 is integrated. The filter 9 is thus pretuned by the control common to all filters in the integrated circuit. As mentioned above, said control sets filter 9 on its theoretical tuning frequency, here the cut-off frequency, with a tolerance of approximately plus or minus five percent. The theoretical cut-off frequency for filter 9 is fixed between the two chrominance carrier frequencies of the SECAM standard, that is, 4.32 MHz.

The output of filter 9 provides a signal proportional to the frequency interval between the input signal of filter 9 and the actual cut-off frequency of the filter. This signal is provided to a first input of a phase comparator 10, a second input of which receives the signal coming into filter 9. Filter 9 also performs a 90° phase shift necessary for phase comparator 10.

Comparator 10 is sampled during the identification periods associated with the SECAM standard by receiving the burst gate BG on a control input. Phase comparator 10 thus issues, during the burst gate BG, a signal proportional to the phase difference between the output signal of stage 8 and the output signal of filter 9. This signal is thus proportional to the frequency interval between the actual cut-off frequency of filter 9 and the frequency of the incoming signal, and hence of the carrier of the current line.

The output current of comparator 10 is used to charge or discharge a capacitor CF. The voltage thus stored goes through a transconductance amplifier 11, the output of which is provided on the terminal FT for adjusting the tuning frequency of filter 9. As an alternative, the input FT of filter 9 can be voltage-controlled. Said input FT constitutes an input for accurately adjusting the filter with respect to the frequency interval measured by phase comparator 10.

Hence, the tuning frequency of filter 9 is locked on the frequency of the incoming signal and it will set on the mean value of the carrier frequencies of the lines of the CVBS signal during the burst gate BG. The Q-factor of filter 9 is high, for example approximately 25, so as to obtain a sufficient gain of the locking loop.

The output of phase comparator 10 is also provided on an output terminal OUT of the detector according to the invention. Said output terminal is used to charge a capacitor CKS, via a flip-flop 12 controlled by the "time reset" signal R.

The capacitor CKS is, as previously, the capacitor for storing the result of the detection associated with the SECAM standard. Conventionally, the level stored in this capacitor CKS is sequentially examined with the levels stored in the capacitors associated with the results of the detectors (not shown) of the PAL and NTSC standards. In practice, and as is shown in FIG. 3, phase comparator 10 has two independent outputs, in order to prevent the voltage stored in the capacitor CF from contaminating the result of the detection sent on flip-flop 12.

According to an alternative embodiment, the high-pass filter 9 can be replaced by a 90° static phase shifter of the output signals of gain stage 8 associated with a band-pass filter, the theoretical central frequency of which is 4.32 MHz.

Figure 4:
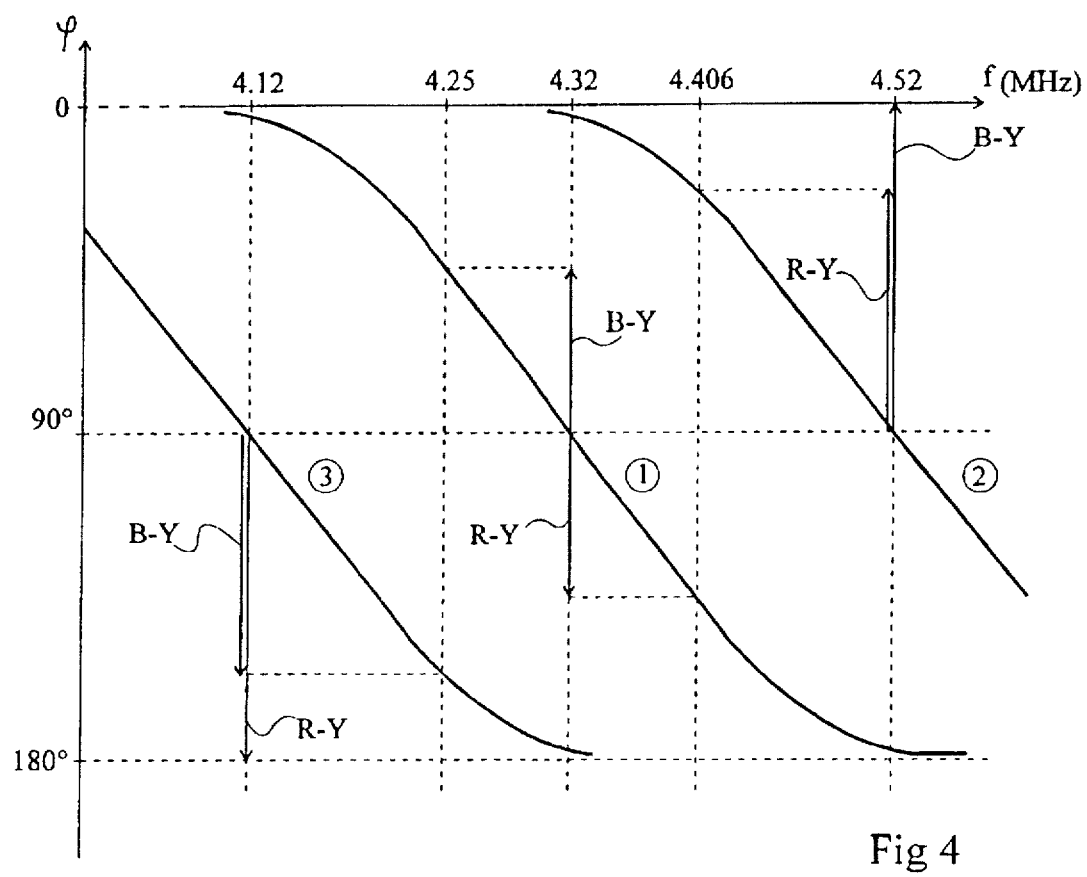
FIG. 4 is a diagram illustrating some phase characteristics of the detector shown in FIG. 3.

FIG. 4 illustrates three cases of phase characteristics of filter 9 according to the value of its actual tuning frequency. These cases respectively correspond to the phase characteristics when the filter is pretuned on its theoretical frequency and when the pretuning frequency of the filter is shifted by adding or subtracting, with respect to this theoretical frequency, a value representing the maximum tolerance value of the pretuning.

If filter 9 is tuned on its theoretical frequency (characteristic ① in FIG. 4), the output signal of the filter will have the same amplitude, but opposite signs for two consecutive lines, respectively B-Y and R-Y, as a signal coded according to the SECAM standard appears. The mean current at the output of phase comparator 10 on two consecutive lines is zero. Thus, no compensation is performed on the lock terminal FT of the filter. Besides, the result stored in capacitor CKS indicates the identification of the SECAM standard.

If the cut-off frequency of the filter is shifted by adding the maximum tolerance value of the pretuning (that is, approximately plus 200 kHz) with respect to its theoretical frequency (characteristic ② in FIG. 4), the amplitudes of two consecutive lines have different values but the same sign. The amplitude during a B-Y line is higher than the amplitude during the next R-Y line.

If, conversely (characteristic ③ in FIG. 4), the cut-off frequency of the filter is shifted by subtracting the maximum tolerance value of the pretuning (that is, approximately minus 200 kHz) with respect to its theoretical frequency, the amplitudes of two consecutive lines still have the same sign, but opposed to that of the previous case (characteristic ② in FIG. 4), and the amplitude during a B-Y line is lower than the amplitude during the next R-Y line.

In the two latter cases, as in the intermediate cases, the filter will progressively recenter on the mean carrier frequency of two consecutive lines, that is, in theory, its theoretical 4.32 MHz frequency. Indeed, the reverse feedback applied on the tuning of filter 9 will settle for a mean output current of phase comparator 10 which will be zero on two consecutive lines. The amplitudes corresponding to two consecutive lines will thus become equal again and the SECAM standard will be identified.

It will however be seen that the filtering provided by capacitor CF is sufficient to avoid excessively large frequency changes from one line to another as a result of the filter locking loop. Moreover, the phase comparator should be designed so that its current variation range allows a frequency lock range of the filter corresponding to the tolerance range of the pretuning. In other words, the current variation range of the phase comparator should provide a lock range of plus or minus approximately 200 kHz and capacitor CF should avoid changing the current to cause a shift of the tuning frequency of the filter. For a frequency deviation of approximately plus or minus 70 kHz which corresponds to the difference between the two frequencies of the carriers of the SECAM standard, the line to line tuning can be allowed an instability of approximately 3 kHz without altering the performance of the locking loop.

As an example, the mean current of the phase comparator is set at approximately 700 nA and the capacitance CF is approximately 40 pF.

In the case of reception of a signal coded according to the SECAM standard, detector 7 will thus always be tuned on the mean frequency of the carriers of two consecutive lines. Hence, cases in which the detector issues a result of no identification when the SECAM standard is present will not occur.

In the case of reception of a signal coded according to the PAL or NTSC standard at 4.43 MHz, the filter is tuned on the frequency of the carrier of the signal at 4.43 MHz and the amplitude at the output of the phase comparator is close to zero. Thus, the capacitor CKS will indicate no identification of the SECAM standard.

In the case of reception of a signal coded according to the PAL or NTSC standard at 3.58 MHz, the filter is tuned on the pretuning frequency, since the frequency of 3.58 MHz is outside the tolerance range of plus or minus five percent. The amplitudes at the output of phase comparator 10 will then be the same and have the same sign for two consecutive lines. Thus, the capacitor CKS will indicate, as a result of the time reset signal, no identification of the SECAM standard.

Another advantage of the detector according to the invention is the fact that tuning the filter on the average between the two actual frequencies of the carriers of two consecutive lines allows detection of the SECAM standard even if the frequencies of the carriers of the receive signal do not exactly correspond to the theoretical frequencies, for instance as a result of noise.

The present invention thus allows reliable identification of the occurrence of a color television signal coded according to the SECAM standard.

Of course, the present invention is likely to have various alterations and modifications which will readily occur to those skilled in the art. Particularly, each of the described components can be replaced by one or several elements assuming the same function. In addition, the practical implementation of the various components of the detector according to the invention according to their use and the constraints they have to meet is within the abilities of those skilled in the art.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalent thereto.

What is claimed is:

1. A detector for detecting reception of a color television signal coded according to the SECAM standard comprising a filter pretuned by a general control of filters of an integrated circuit for identifying the standard according to which the television signal is coded, a phase comparator receiving the input and output signals of the filter, and means for tuning the frequency of said filter to the actual mean frequency of two consecutive lines of the signal.

2. A detector for detecting reception of a color television signal coded according to the SECAM standard of the type including a filter pretuned by a general control of said filters of an integrated circuit for identifying the standard according to which said television signal is coded and a phase comparator receiving input and output signals of said filter, including means for tuning the frequency of said filter to the actual mean frequency of two consecutive lines of said signal, wherein said means comprise a reverse feedback loop including said phase comparator and a capacitor for storing a value resulting from said phase comparison.

3. A detector for detecting reception of a color television signal coded according to the SECAM standard according to claim 2, wherein the output of the phase comparator is connected to a first terminal of the capacitor, the other terminal of which is grounded, and to a transconductance amplifier, the output of which is sent on a terminal for adjusting the tuning frequency of the filter.

4. A detector for detecting reception of a color television signal coded according to the SECAM standard according to claim 1, wherein the output of the phase comparator is sent, via a flip-flop controlled by a "time reset" signal, to a capacitor for storing the result of the identification.

5. A detector for detecting reception of a color television signal coded according to the SECAM standard according to claim 1, wherein a theoretical pretuning frequency of said filter corresponds to the actual mean frequency between the two frequencies of the chrominance carriers of the SECAM standard.

6. A detector for detecting reception of a color television signal coded according to the SECAM standard according to claim 5, wherein said filter is a high-pass filter with a high Q-factor.

7. A detector for detecting reception of a color television signal coded according to the SECAM standard according to claim 5, wherein said filter is a band-pass filter, and wherein a 90° phase shifter is provided upstream of said filter.

8. A detector for detecting reception of a color television signal coded according to the SECAM standard according to claim 1, wherein the phase comparator is sampled during reference bursts included in the television signal.

9. A detector for detecting reception of a color television signal coded according to the SECAM standard according to claim 1, including upstream of said filter, a gain stage sampled during the line fly-back periods.

10. A detector for detecting reception of a color television signal coded according to the SECAM standard according to claim 1, wherein the theoretical tuning frequency of said filter is 4.32 MHZ.

11. A detector for detecting reception of a color television signal coded according to the SECAM standard according to claim 3, wherein said phase comparator has a current variation range which allows a frequency lock range of said filter corresponding to the tolerance range of said pretuning frequency.

12. A detector for detecting reception of a color television signal coded according to the SECAM standard according to claim 11, wherein said frequency lock range is plus or minus 200 kHz.

13. A method for detecting reception of a color television signal coded according to the SECAM standard comprising the steps of:

receiving a signal;

filtering said signal to provide a filtered output signal;

comparing phases of said signal to phases of said filtered output signal;

adjusting a filtering frequency of said filtering step in response to said comparing phases step by setting said filtering frequency to correspond to an actual mean frequency of two consecutive lines of said signal; and outputting a result of an identification of said detected television signal.

14. A method for detecting reception of a color television signal coded according to the SECAM standard, as claimed in claim 13, further comprising the step of pretuning said frequency of said filtering according to a common control of filters in an identification circuit.

15. A method for detecting reception of a color television signal coded according to the SECAM standard, as claimed in claim 13, further comprising the step of phase shifting said received signal by 90°.

16. A method for detecting reception of a color television signal coded according to the SECAM standard, as claimed in claim 13, further comprising sampling a gain stage upstream of said filter during line fly-back periods.

17. A method for detecting reception of a color television signal coded according to the SECAM standard, as claimed in claim 13, wherein said filtering step is performed by a high-pass filter with a high Q-factor.

18. A method for detecting reception of a color television signal coded according to the SECAM standard, as claimed in claim 13, further comprising sampling said result of said comparing phases step during reference bursts which are included in said television signal.

19. A detector for detecting reception of a color television signal coded according to the SECAM standard comprising:

a gain stage;

a filter receiving a signal from said gain stage, said filter tunable to a general control of filters in a circuit;

a phase comparator comparing an input signal of said filter to an output signal of said filter;

a transconductance amplifier receiving an output of said phase comparator, said transconductance amplifier sending an output through a reverse feedback loop to said filter to adjust said filter to an actual mean frequency of two consecutive lines of said television signal; and wherein said phase comparator also provides an output signal representing a detection of said television signal.

20. A detector for detecting reception of a color television signal coded according to the SECAM standard as claimed in claim 19, further comprising a first capacitor receiving an output signal of said phase comparator and supplying said output signal to said transconductance amplifier.

21. A detector for detecting reception of a color television signal coded according to the SECAM standard as claimed in claim 19, further comprising a second capacitor to store a value representing a result of said detection of said television signal.

22. A detector for detecting reception of a color television signal coded according to the SECAM standard as claimed in claim 21, wherein a flip-flop controlled by a time reset signal sends said output signal of said phase comparator to said second capacitor.

23. A detector for detecting reception of a color television signal coded according to the SECAM standard as claimed in claim 19, wherein said filter is a high-pass filter with a high-Q factor.

24. A detector for detecting reception of a color television signal coded according to the SECAM standard as claimed in claim 19, wherein said filter is a band-pass filter with a 90° static phase shifter.

25. A detector for detecting reception of a color television signal coded according to the SECAM standard as claimed in claim 19, wherein said filter tuned to an actual mean frequency of two consecutive lines is tuned to 4.32 MHZ.

* * * * *